United States Patent [19]

Lucas

[11] 4,419,468

[45] Dec. 6, 1983

[54] ELECTRODEPOSITABLE COMPOSITIONS

[75] Inventor: Joseph P. Lucas, Wexford, Pa.

[73] Assignee: PPG Industries, Inc., Pittsburgh, Pa.

[21] Appl. No.: 446,127

[22] Filed: Dec. 2, 1982

Related U.S. Application Data

[63] Continuation of Ser. No. 269,132, Jun. 1, 1981, abandoned.

[51] Int. Cl.³ .............................................. C08L 63/02
[52] U.S. Cl. .............................. 523/426; 204/181 C; 523/414; 523/415; 524/284; 524/287; 524/555; 524/901
[58] Field of Search ....................... 523/414, 415, 426; 524/284, 287, 901, 555; 204/181 C

[56] References Cited

U.S. PATENT DOCUMENTS

| | | | |
|---|---|---|---|
| 3,230,162 | 1/1966 | Gilchrist | 204/181 |
| 3,424,663 | 1/1969 | Weigel | 204/181 |
| 3,579,429 | 5/1971 | Manson et al. | 204/181 |
| 3,939,051 | 2/1976 | Anderson et al. | 204/181 |
| 4,076,676 | 2/1978 | Sommerfeld | 260/29.4 R |
| 4,136,070 | 1/1979 | Hazan | 260/23 AR |
| 4,218,296 | 8/1980 | Gilchrist | 204/181 C |

*Primary Examiner*—Theodore E. Pertilla
*Attorney, Agent, or Firm*—Godfried R. Akorli

[57] ABSTRACT

The present invention discloses cataphoretic electrodeposition of metal articles wherein staining or discoloration particularly of light colors is prevented or reduced. The electrodepositable compositions of this invention comprise aqueous cationic paint dispersions blended with polyacids; the polyacids are introduced into electrodeposition baths by the addition of the acids thereto.

5 Claims, No Drawings

ELECTRODEPOSITABLE COMPOSITIONS

This is a continuation of application Ser. No. 269,132, filed June 1, 1981 now abandoned.

BACKGROUND OF THE INVENTION

1. Field of the Invention

The present invention relates to cationic electrodeposition baths and to the use of these baths in cationic electrodeposition of metal articles.

2. Brief Description of the Prior Art

Electrodeposition of aqueous organic coating compositions has risen to industrial prominence in recent years. The process has many advantages including uniformity and completeness of coating, even on intricate shapes. The process results in labor savings and pollution abatement. Virtually any electrically conductive substrate can be coated. There are, however, a number of disadvantages that attend the electrodeposition process.

In anionic electrodeposition wherein coatings deposit on the anode, less than desirable properties of corrosion resistance and appearance are obtained. These shortcomings have been ascribed to the nature of the process. Specifically, it is believed that these shortcomings are due, in part, to metal dissolution from the anodes, caused by the electrolytic action of the bath.

Particular interest has recently arisen in cationic electrodeposition wherein coatings deposit on the cathode. For, when the article is the cathode, there is greatly reduced metal ion dissolution which commonly causes poor corrosion resistance and staining in the anionic systems.

Examples of cationic electrodeposition are described in U.S. Pat. Nos. 3,799,854 and 3,984,299, both to Jerabek, and 3,947,338 to Jerabek and Marchetti. The cationic solubilizing groups in these resins are amine acid salts. Also suitable for cationic electrodeposition are quarternary ammonium salt group-containing resins such as those described in U.S. Pat. Nos. 3,962,165 and 4,001,156 to Bosso and Wismer.

Although cationic electrodeposition offers signficant improvement over anionic electrodeposition, there are still problems that attend the presence of ions in electrodeposition baths. The ions present in cationic electrodeposition baths are generally from sources different from or besides those present in anionic electrodeposition baths, as discussed above. Paradoxically, the ions are sometimes purposefully introduced into the bath so as to improve some other properties of electrodepositable resins.

It has, for example, been noticed that for maximum corrosion-resistant coatings over ferrous metal, the metal must be pretreated, e.g., by phosphating, before it is electrocoated. The pretreatment operations, although employed on many industrial electrodeposition lines, are undesirable for a number of reasons, such as cost, pollution, and non-uniform deposition particularly on complexed shaped articles. To compensate for the shortcomings or deficiencies in the pretreatment process, or even do away with them, lead ions ($Pb^{+2}$) are introduced into the electrodeposition bath by adding water-soluble lead compounds to the bath, as described in U.S. Pat. No. 4,115,226.

Another source of the ions found in the bath, it is believed, is iron dissolution from bath accessories such as plumbings and pumps which are typically made from mild steel, when certain acid-solubilized resins are employed in the electrodeposition.

The presence of metal ions in the bath poses a significant problem in the application of coating compositions of "light" colors such as white or pastels. It has been noticed that when the coating compositions of light colors are applied cathodically, they can appear stained or discolored. For aesthetic or functional reasons, the discoloration is a matter of particular concern in instances when one-coat application of light color is desired.

By the present invention, it has been discovered that during cationic electrodeposition, when staining or discoloration due to the presence of metal ions, particularly from sources afore-described occur, the discoloration or staining can be prevented or significantly reduced.

SUMMARY OF THE INVENTION

The present invention encompasses an improved method of electrocoating an electrically conductive article serving as a cathode in an electrical circuit comprising an anode, said cathode immersed in a cationic electrodepositable coating composition comprising an aqueous cationic paint dispersion particularly to provide for a light color coating on the substrate being coated; the improvement comprising the addition to said paint of about 100 to 2000 parts per million of a polyacid based on total weight of the composition to reduce discoloration of the coating due to metallic ions in the paint.

Consonant with the foregoing, the claimed invention also encompasses a cationic electrodepositable coating composition comprising a blend of:

(A) an aqueous cationic paint dispersion to provide a light color coating, and
(B) a polyacid which is present in an amount sufficient to reduce discoloration of the coating due to metallic ions in the paint.

More preferably, the amount of the polyacid in the bath ranges from about 100 to 1500, and most preferably from about 500 to 1000, parts per million based on total weight of the composition.

Representative of the polyacids preferred herein are acids such an oxalic acid, tartaric acid, citric acid and phosphoric acid. When the acids are employed in the manner of this invention, it is noteworthy that discoloration or staining as described herein is reduced or prevented without significantly lessening the performance of the bath. It should be noted that while the discoloration is believed to be due to metallic ions, particularly from the sources described herein, it is also recognized that metals or metallic ions may assume forms which actually or contributorily cause the discolorations.

DETAILED DESCRIPTION

The electrodepositable coating compositions of this invention are prepared preferably by blending the polyacid with the cationic paint. Typically, the preparation entails the introduction of the polyacid into an electrodeposition bath containing the cationic paint, by adding the polyacid into the bath and then mixing the contents of the bath. Alternatively, the electrodepositable coating composition can be prepared by blending the polyacid with an acid-solubilized resin vehicle or the pigment paste, which are used in preparing the cationic paint, and dispersing the blend in the normal manner to form the electrodepositable coating composition. In this context, by the term "blending" is meant the addition of the polyacid to a cationic resin, itself, an aqueous dispersion thereof, or the cationic paint. The polyacid is not added for the purpose of neutralizing the resinous vehicle of the paint. Although some partial neutralization may occur, it is believed to be negligible.

The polyacid is added in sufficient amounts to prevent or reduce discoloration of coatings, particularly those of a light color, due to metallic ions in the paint. Low amounts of metallic ions have been found to induce discoloration. Amounts as low as 50 ppm based on the total weight of the electrodepositable composition could induce discoloration. At about 100 ppm, iron, and lead ions, for example, begin to show noticeably undesirable discoloration. As would be expected, as the amount of metallic ions increases, the discoloration worsens. The reduction or prevention is determined by comparing, visually or with a device such as a colorimeter, the appearance of the coatings obtained from electrodeposition baths in accordance with this invention with coatings obtained from essentially the same electrodeposition bath to which the polyacid was not added.

The amount of polyacid which is blended is usually in the range from about 100 to 2000, more preferably from about 100 to 1500, and most preferably from about 500 to 1000 parts per million (ppm) based on the total weight of the electrodepositable composition. Addition of the polyacid above the upper limit is not recommended because of bath instability. As the electrodeposition proceeds, the polyacid content in the electrodeposition bath may become depleted. It may, therefore, be necessary to add additional polyacid as the electrodeposition process proceeds.

The polyacids useful herein are selected on the basis that they would be compatible with water. Preferably, the acid is dispersible in the cationic composition. Additionally, the acids should not volatilize at electrodeposition bath temperatures. Preferred herein are polycarboxylic acids which have, preferably, from about 2 to 36, more preferably from about 2 to 10, and most preferably from about 2 to 5, carbon atoms. Of these acids, dicarboxylic acids are preferred. Examples of the dicarboxylic acids which have been found to be useful are oxalic, azelaic, phthalic, fumaric, maleic and tartaric acids. Illustrative of other dicarboxylic acids are aliphatic diacids such as malonic, succinic and glutaric acids; aromatic dicarboxylic acids such as isophthalic acid.

Examples of other polyacids useful herein are citric acid and phosphoric acid.

It is desired to point out that the acids useful herein can be unsubstituted or substituted provided that the substitution does not adversely affect solution or film properties of the electrodepositable composition of the present invention. It is further desired to point out that the acids of this invention can be used as such or in the form of their acid functional derivatives. The salts or anhydrides of the acids have been found to be useful in the practice of this invention. Generally put, any derivative of the useful acid can be used as a precursor of the acid provided that it is converted to the acid in a reasonable period of time to be operative in the context of this invention. Also, it is comtemplated that other polycarboxylic-containing materials, particularly those of a molecular weight of less than about 750, will be useful in this invention. Illustrative of these polycarboxylic-containing materials are ethylene glycol diadipates, and reaction products of lactic acid and toluene diisocyanate.

The cationic electrodepositable coating compositions of the invention include an aqueous dispersion cationic paint which comprises a resinous vehicle such as an acid-solubilized resinous vehicle, pigments to provide for a light color coating on the substrate being coated; there are optionally other additives. The acid-solubilized resins which are used in the practice of the invention include amine salt group-containing resins which are well known in the art for cationic electrodeposition. An example of suitable resinous systems are those disclosed in U.S. Pat. Nos. 3,799,854; 3,984,299; 3,947,338 and 3,947,339 to Jerabek. In a preferred embodiment of the invention, the electrodepositable resin comprises amine salt group-containing resins which are reaction products of an organic polyepoxide and a secondary amine. The resinous reaction product is solubilized with acid to provide the amine salt groups. Usually these amine salt group-containing resins are used in combination with a blocked isocyanate curing agent as described in the aforementioned Jerabek patents.

Amine salts of acrylic polymers can also be used in the practice of the invention, and examples include those described in U.S. Pat. No. 3,458,240 to Spoor et al.

Besides amine salt group-containing resins, quaternary ammonium salt group-containing resins can also be employed. Examples of these resins are those formed by reacting an organic polyepoxide such as a polyglycidyl ether of a polyphenol with a tertiary amine acid salt. Such resins are described in U.S. Pat. Nos. 3,962,165; 3,975,346 and 4,001,156 to Bosso and Wismer, and U.S. Pat. No. 3,935,087 to Jerabek and Marchetti.

Examples of other cationic resins are ternary sulfonium salt group-containing resins such as those described in U.S. Pat. No. 3,793,278 to DeBona and quaternary phosphonium salt group-containing resins such as those described in U.S. Pat. No. 3,959,106.

In the embodiments of this invention wherein acid-solubilized resinous vehicles are employed, it is preferred the diacids are different from the acids which are intended for solubilizing the resin.

Besides the acid-solubilized resinous vehicle, the cationic paint comprises pigments which provide for a white or pastel coating, e.g., ivory, eggshell, oyster white, cream, beige or light gray. Examples of pigments which can be used to provide the light color coating are titanium dioxide, iron oxides, and various yellow, blue, green and red pigments. The pigments are usually incorporated into the paint by grinding with a grinding vehicle to form a pigment paste and then mixing the paste with the resinous vehicle. U.S. Pat. No. 4,007,154 describes typical grinding vehicles and pastes suitable for cationic electrodeposition.

It has been found in most instances that desirable coatings are obtained using pigmented compositions containing weight ratios of pigment to vehicle of 1.5:1 or less and preferably less than about 1:1. If the composition has too high a pigment-to-vehicle ratio, the electrodeposition film may deposit with poor flow characteristics.

For electrodeposition, the aqueous dispersion cationic paint contains from about 5 to 25 percent by weight resin solids. The term "aqueous dispersion" as used within the context of the present invention is intended to cover 2-phase, translucent, aqueous-resinous systems, especially those in which the aqueous phase forms the continuous phase. The aqueous dispersions of the present invention have dispersed phases which have average particle size diameters of about 0.1 to 5 microns. The dispersed phase may be spherical or elongated in shape or actually invisible by microscopic investigation.

In formulating the water-dispersed compositions, ordinary tap water may be employed. However, such water may contain a relatively high level of cations, which, while not ordinarily rendering the process inoperative, may result in variations in the properties of the baths when used for electrodeposition. In such cases, it is often desirable to utilize deionized water from which the free ions have been removed, as by passage through an ion-exchange resin column.

In the practice of the invention, it has been discovered that the polyacids in amounts of about 1000 ppm may render the substrates coated therein more susceptible to corrosion. This attendant corrosion can be attenuated or prevented, it has been found by, say, increasing the time or temperature of curing or the amount of catalyst for the curing agent, for example, increasing the amount of tin catalyst for an isocyanate curing agent.

There may also be included in the coating composition as additives other anti-corrosion agents as described in U.S. Pat. No. 4,115,226, incorporated herein by reference. Yet other additives such as anti-oxidants, wetting agents, dryers, antifoaming agents, suspending agents and the like are generally contained in the coating composition. It is often desirable to include small amounts of water-miscible organic solvents, which may be added to the resinous vehicle to aid in handling and processing. Examples of such solvents are 4-methoxy-4-methyl-pentanone-2, and other solvents such as dioxane and glycol ethers can be used.

In the electrodeposition process employing the cationic electrodepositable coating compositions described above, the compositions are placed in contact with an electrically conductive anode and an electrically conductive cathode, with the surface to be coated being the cathode. Upon passage of the electric current between the anode and the cathode, while in contact with the bath containing the coating composition, an adherent film of the coating composition is deposited on the cathode.

The conditions under which electrodeposition is carried out are, in general, similar to those used in electrodeposition of other types of coatings. The applied voltage may be varied greatly and can be, for example, as low as one volt or as high as several thousand volts, although typically between 50 volts and 500 volts are employed. Current density is usually between about 1.0 ampere and 15 amperes per square foot and tends to decrease during electrodeposition.

For electrodeposition, the coating compositions can be applied to a variety of electroconductive substrates especially metals such as steel, aluminum, copper, magnesium and the like, but also including metallized and conductively coated materials.

After deposition, the coating is cured at elevated temperatures by any convenient method, such as by baking in ovens or with banks of infrared heat lamps. Curing temperatures depend principally on the curing agent employed, and when the curing agent is a blocked isocyanate such as described above, curing is usually accomplished at between 75° to 300° C.

The principal advantage of the instant invention resides in preventing or reducing discoloration of light colors in cathodic electrodeposition baths without significantly lessening the performance of the cationic paint. It has also been found that even the dark colors may be affected when the discoloration problem is severe enough. In this regard, the diacids described herein can be employed to prevent or reduce the discoloration.

This and other aspects of the invention will be described further in conjunction with several examples showing the method and practice of the invention. These examples, however, are not to be construed as limiting the invention to their details.

EXAMPLES

A series of experiments involving the addition of various polyacids to electrodeposition baths comprising aqueous cationic paint dispersions, were conducted to evaluate the reduction or prevention of yellowing due to the presence of metal ions.

The cationic electrodepositable paint is prepared in the manner described in U.S. Pat. No. 4,104,147 and was prepared by chain extending a polglycidyl ether of bisphenol A (epoxy equivalent about 500) with polycaprolactone diol. The chain-extended product was reacted with a secondary amine solubilized in aqueous medium with acetic acid and combined with a fully blocked isocyanate crosslinking agent. The composition contained a tin catalyst and was pigmented with lead silicate, clay and titanium oxide. The composition had a solids content of 20 percent and a pigment-to-binder ratio of about 0.4 to 0.5:1.

EXAMPLE I

This example illustrates the discoloration effect due to the presence of metal ions in the electrodeposition bath.

To a bath comprising the electrodepositable cationic paint prepared as described above was added lead ions, in the form of lead acetate, in incremental amounts to induce discoloration. Upon each addition, a steel substrate was electrocoated at 275 volts for 90 seconds in the paint, baked at 375° F. (191° C.) for 20 minutes, and evaluated as to its appearance. The amount of lead ions added to the bath and the effect thereof on the appearance of substrates coated in the bath are reported below. Substrates coated in the electrodepositable cationic paint to which were added no metal ions served as controls.

TABLE 1

| Cationic Paint | Metal Ions Added in ppm | Appearance |
|---|---|---|
| (I) Control | 0 | gray color |
| (II) | 100 | |
| (III) | 300 | color turned |
| (IV) | 500 | continuously darker |
| (V) | 1000 | |
| (VI) | 1500 | brown color |

EXAMPLE II

This example illustrates the effect of adding polyacids to cationic paints to reduce or prevent discoloration.

Electrodepositable baths containing the cationic paints of Example I were prepared. To some of the baths were added lead ions, in the form of lead acetate, in amounts which have been found to cause discoloration. Serving as controls were baths to which no metal ions and, of course, no polyacids were added. The amounts of the metal ions added to induce discoloration, and the amount of polyacid added to reduce or prevent discoloration are reported in Table 2 below.

Steel panels were electrodeposited in the control baths, in the baths with the metal ions and in the baths with the metal ions to which the polyacid was added. The electrodeposition was conducted at 200 volts for 90 seconds, the panels were then baked at 177° C. for 20 minutes.

The appearance of the coated panels, after baking, was evaluated by a colorimeter and reported in Table 2 below. The colorimeter is a well-known device for measuring relative color. A Macbeth Model 1010 colorimeter of illuminate A (type of light) and color difference formula Lab was used herein. A detailed understanding of the working principles of the colorimeter is aided by a reference to a pertinent text: *The Measurement of Appearance* by Richard S. Hunter, Chapter 9, Wiley Interscience Publication (1975). In these experiments, the colorimeter measured the lightness or darkness ($\Delta L$) of the panels coated in the electrodeposition bath containing the lead ions, baths containing both lead ions and the polyacids versus the control; the more negative the value for $\Delta L$, the darker the color.

TABLE 2

Appearance of Panels from Bath (Based on Color Difference from Panel Coated in the Control Baths):

| Containing 500 ppm $Pb^{+2}$ $\Delta L$ | To Which is Added 500 ppm Polyacid $\Delta L$ | Polyacid Added |
| --- | --- | --- |
| −3.4 | −1.9 | Phthalic |
| −4.6 | −1.0 | Citric |
| −2.3 | −0.7 | Fumaric (cis) |
| −5.0 | −0.8 | Maleic (trans) |
| −1.4 | 2.1 | Tartaric |
| −1.0 | −0.5 | Adipic |
| −1.5 | 2.0 | Dimer Acid* |
| −3.8 | 0.0 | Tartaric-DEEA** |
| −4.0 | −1.1 | Azelaic |
| −1.4 | 1.2 | Phosphoric |

*$C_{36}$ diacid from Emery Industries, equivalent weight 286.
**Dimethylethanolamine salt of tartaric acid.

EXAMPLE III

In addition, an experiment was conducted with water-soluble iron, formed upon the addition of iron filings. The water-soluble iron was found to induce discoloration in cationic paints.

Iron filings were added to an electrodeposition bath containing the cationic paint of Example I. The bath was stirred for 3 days, and then filtered. Anaylsis of the bath showed that it contained 300–400 ppm of soluble iron. Panels electrocoated in the bath were baked and then evaluated as to their appearance. The baked panels appeared yellow in color.

About 0.8 gm. of oxalic acid were then added to a bath containing 1500 gm. of the cationic paint to which was added the solubilized iron in the manner and amount described above. Panels electrocoated in this bath were baked and then evaluated as to their appearance. The yellowing caused by the addition of the water-soluble iron was found to have been significantly reduced when the acid was added.

The above-described electrodeposition of the panels was conducted at a voltage ranging from 175 to 300 volts for 90 seconds and then baking was conducted at 375° F. (191° C.) for 20 minutes.

Therefore, what is claimed is:

1. A cationic electrodepositable coating composition comprising:
   (A) an aqueous cationic paint dispersion, and further consisting essentially of:
   (B) an organic polycarboxylic acid or a salt thereof, said acid or salt being present in an amount sufficient to reduce discoloration of a coating due to metallic ions in the paint.

2. A cationic electrodepositable composition of claim 1, wherein the organic polycarboxylic acid or the salt thereof is present in an amount ranging from about 100 to 2000 parts per million based on total weight of the composition.

3. A cationic electrodepositable composition of claim 2, wherein the organic polycarboxylic acid or the salt thereof is present in an amount ranging from about 100 to 1500 parts per million based on total weight of the composition.

4. A cationic electrodepositable composition of claim 3, wherein the organic polycarboxylic acid or the salt thereof is present in an amount ranging from about 500 to 1000 parts per million based on total weight of the composition.

5. A cationic electrodepositable composition of claim 1, in which the organic polycarboxylic acid or the salt thereof is selected from the group consisting of tartaric, oxalic, maleic, azelic, citric, phthalic, and fumaric acids, or salts thereof.

* * * * *